US012591643B1

(12) United States Patent
Qi et al.

(10) Patent No.: US 12,591,643 B1
(45) Date of Patent: Mar. 31, 2026

(54) MULTI-LEVEL TEXT AND TYPING DATA AUTHENTICATION

(71) Applicant: PayPal, Inc., San Jose, CA (US)

(72) Inventors: Panpan Qi, Singapore (SG); Zhe Chen, Singapore (SG); Rajeevan Paul Santhiyapillai, Singapore (SG)

( * ) Notice: Subject to any disclaimer, the term of this patent is extended or adjusted under 35 U.S.C. 154(b) by 11 days.

(21) Appl. No.: 18/903,762

(22) Filed: Oct. 1, 2024

(51) Int. Cl.
G06F 21/30 (2013.01)

(52) U.S. Cl.
CPC .................................... G06F 21/30 (2013.01)

(58) Field of Classification Search
CPC ....................................................... G06F 21/30
See application file for complete search history.

(56) References Cited

U.S. PATENT DOCUMENTS

| | | | |
|---|---|---|---|
| 11,636,486 B2 | 4/2023 | Chen | |
| 11,907,658 B2 | 2/2024 | Chen et al. | |
| 2018/0308003 A1* | 10/2018 | Singh | ..................... G06N 20/00 |
| 2021/0112080 A1 | 4/2021 | Chen | |
| 2022/0044244 A1 | 2/2022 | Chen | |
| 2022/0086147 A1 | 3/2022 | Chen et al. | |
| 2022/0247662 A1 | 8/2022 | Chen | |
| 2023/0084532 A1 | 3/2023 | Chen et al. | |

| | | | |
|---|---|---|---|
| 2024/0202256 A1 | 6/2024 | Chen et al. | |
| 2024/0211559 A1 | 6/2024 | Chen et al. | |
| 2024/0289552 A1* | 8/2024 | Tay | ...................... G06N 3/0464 |

FOREIGN PATENT DOCUMENTS

| | | |
|---|---|---|
| WO | 2023272594 A1 | 1/2023 |
| WO | 2023107748 A1 | 6/2023 |
| WO | 2023158949 A1 | 8/2023 |

* cited by examiner

*Primary Examiner* — Hee Soo Kim
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to determining whether input data is authentic. A system detects input data, that includes text data and typing data, at a computing device. The system may generate, using a string model, a string-level prediction for the input data, where the string model is trained to increase a similarity between embeddings of authentic text data and corresponding sequences of typing data. Using a character model, the system may generate a character-level prediction for the set of input data, where the character-level model predicts an intended sequence of characters based on the text data and a sequence of typing actions included in the input data. Using machine learning, the system determines, based on the string-level prediction and the character-level prediction, whether the input data is authentic input. The system transmits, to the device, a decision that is generated based on determining whether the input data is authentic.

20 Claims, 7 Drawing Sheets

*Example Data Table*
*200*

| Text Data 206 | Typing Data 204 | | | Final Prediction 262 | Authentication Decision 212 |
|---|---|---|---|---|---|
| Nichole Green | 1s ☐ 1s ☐ 1s ☐ 1s | | | 0.1 | Yes |
| Tom Taylor | 1s ☐ 3s ☐ 2s ☐ 1s | | | 0.3 | Yes |
| aaaaabbbb | 4s ☐ 3s ☐ 1s | | | 0.7 | No |
| asd eww$ | 1s ☐ 2s ☐ 3s ☐ 1s | | | 0.95 | No |

⋮                    ⋮                    ⋮          ⋮

Computer System
110

KEY 400
s: Input String
i(n): Intention Prediction Sequence
t(n): Time Interval

*Method 600*

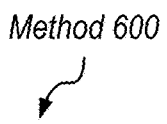

Detect a set of input data at a computing device, where the set of input data includes text data and typing data.
610

Generate, using a string-level model, a string-level prediction for the set of input data, where the string-level model is trained to increase a similarity between embeddings of authentic text data and corresponding sequences of typing data included in the set of input data.
620

Generate, using a character-level model, a character-level prediction for the set of input data, where the character-level model predicts an intended sequence of characters based on the text data and a sequence of typing actions included in the set of input data.
630

Determine, using a machine learning model, whether the set of input data detected at the computing device is authentic input, where the determining is performed based on the string-level prediction and the character-level prediction.
640

Transmit, to the computing device, an authentication decision, where the authentication decision is generated based on determining whether the set of input data is authentic..
650

*Fig. 6*

MULTI-LEVEL TEXT AND TYPING DATA AUTHENTICATION

BACKGROUND

Technical Field

This disclosure relates generally to techniques for authenticating input data, and, more specifically, to performing a multi-level analysis of both text and typing data included in the input data.

Description of the Related Art

In various computing scenarios, input data may be either authentic or not authentic. In fact, some input may be gibberish. For example, account names may either be entered by an end user or by a computer robot (also referred to as a "bot") e.g., in situations involving suspicious activity. Many systems that receive input, such as account names, perform analysis of the input in an attempt to detect whether the input is authentic. Such analysis is often performed prior to using the input data for other actions (e.g., to prevent errors or security breaches within the system that received the input). Many traditional methods for determining input data authenticity focus on analyzing the entered text data itself. In the example scenario of the input being an account name, however, this often leads to identifying the account name as gibberish when, in fact, it is authentic. For example, an account name may include special characters, causing traditional analysis methods to identify this account name is gibberish even when it is a legitimate account name.

BRIEF DESCRIPTION OF THE DRAWINGS

FIG. 6 is a flow diagram illustrating an example method for providing an authorization decision for input data based on both string-level and character-level analyses of the input data, according to some embodiments.

DETAILED DESCRIPTION

Figure 1:
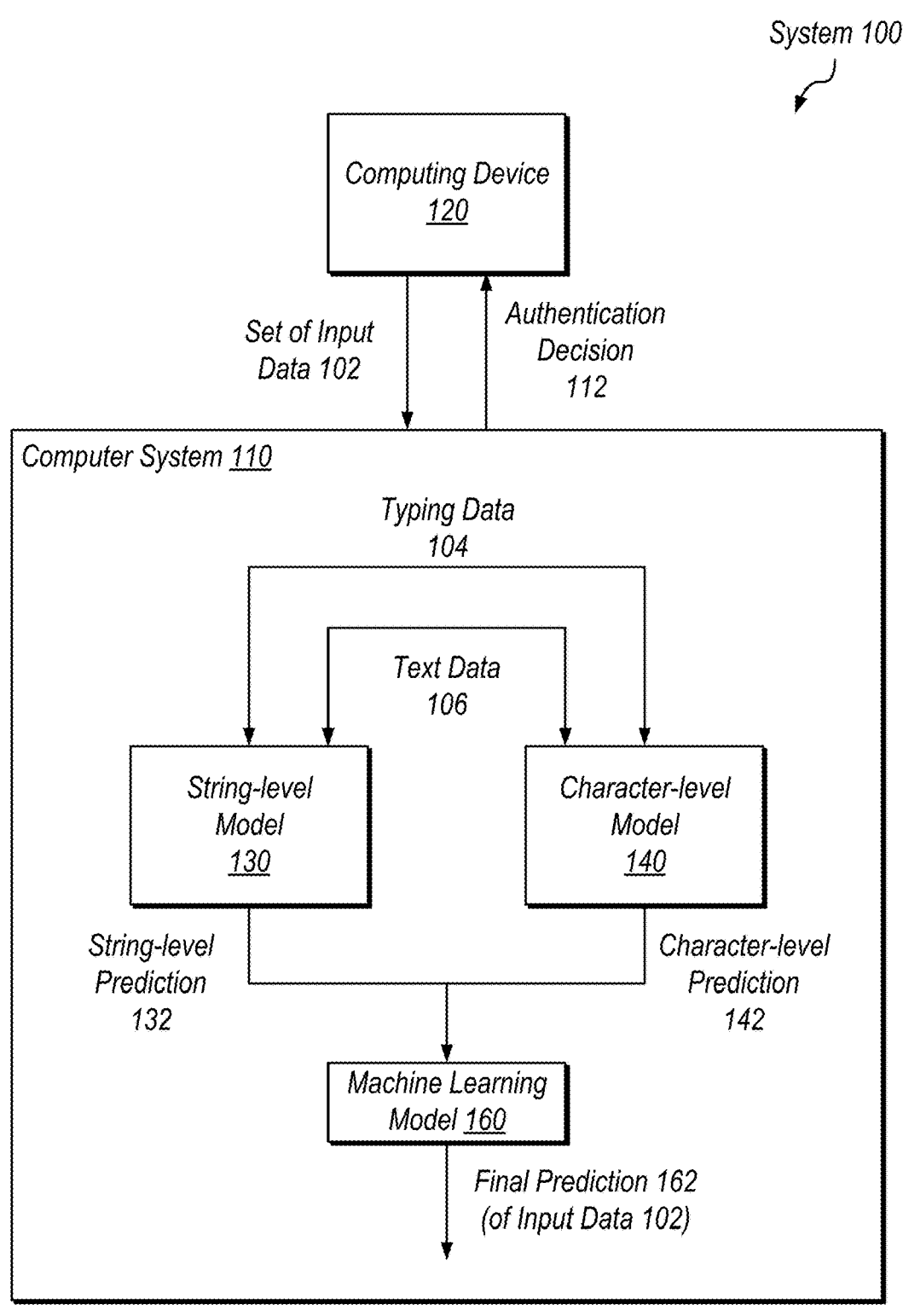
FIG. 1 is a block diagram illustrating an example system configured to generate an authentication decision for input data using both string-level and character-level analyses, according to some embodiments.

Systems that receive input in various forms via, for example, input fields on websites or mobile applications, are vulnerable to unsafe or even malicious inputs. For example, if a user generates an account with an electronic communication processing system (such as an instant messaging platform, an email platform, a transaction processing system), that user often generates and registers an account name and password with the processing system. The authenticity of this account name may be determined by the processing system both at the time the account name is generated as well as during logins using the account name after it has been registered before allowing the user to proceed with accessing and using their account. In various computing scenarios, input data may be either authentic or not authentic. For example, account names may be entered by an end user or may be entered by a computer robot (often referred to as a "bot") e.g., in situations involving fraudulent activity. In such situations, input entered by an end user is likely to be authentic, while input entered by a bot may not be authentic (e.g., is likely gibberish). As another example, an end user may enter an account name, but may type a gibberish account name to speed up the account creation process or to obfuscate their identity. In this example, the account name is likely not authentic.

Many systems that receive input have various levels of safe-guards and analytics to prevent unwanted activity. For example, a system may evaluate input data in an attempt to detect whether the input is authentic. Such evaluation is often performed prior to using the input data for other actions e.g., to prevent errors or security breaches within the system that received the input. Many traditional methods focus on evaluating the entered text data in isolation, which often leads to identifying input as not authentic when, in fact, it is authentic. An account name may include numbers or special characters, which may cause traditional analysis methods to identify this account name a gibberish even if it is a legitimate account name. Account names that include Chinese characters, Chinese pinyin characters, etc. for example, are likely to confuse traditional methods of analysis, which often analyze Latin characters, even when such account names are authentic.

To combat such confusion and erroneous evaluation, the disclosed techniques perform an analysis of input data, including both input text and corresponding device signals, on both a string-level and a character-level via the use of different machine learning techniques. Analysis of device signals includes an analysis of typing sequences which are a series of character typing intervals, including the amount of time between each key stroke executed to enter the string. The disclosed string-level analysis is performed on an entire string as it is input as well as corresponding typing sequences. The string-level model used in disclosed techniques is trained using a contrastive learning process. This contrastive learning process attempts to simultaneously maximize a similarity between legitimate input strings and corresponding typing sequences that follow a known behavioral pattern and minimize a similarity between input strings and irrelevant (e.g., random behavior) typing sequences. As discussed above, an input string may be an account name; however, an input string may also be any of various types of input text, such as identification information, queries, address information (e.g., email address), etc.

In contrast, the disclosed character-level analysis of input data is a more nuanced analysis than the string-level analysis. In disclosed techniques, a character-level analysis is performed to predict the character intention for each typing action taken to input a given string. For example, the character-level analysis is concerned with the sequence of characters that an end user intended to input during the actual sequence of typing actions. As one example, if a user enters the following sequence of typing actions, "a, c, delete, b," this sequence of typing actions results in the account name "ab." In such a scenario, the disclosed character-level analysis predicts that the intention of the user is to type "b"

after typing "a," even though the sequence of typing actions was "a, c, delete, b." When predicting an intended character sequence, the disclosed character-level model also receives device signals, such as typing characteristics, for each typing action as input. In disclosed techniques, the character-level analysis may be performed using a long short-term memory (LSTM) recurrent neural network (RNN) model, as discussed in further detail below with reference to FIGS. 4A and 4B.

After analyzing a set of input using two different machine learning models trained to analyze both the input text and corresponding typing actions performed to enter the text, the disclosed techniques evaluate the output of the two machine learning models in combination. Specifically, the disclosed techniques concatenate two vectors produced by the string-level and character-level analyses. This concatenated vector is input into a final machine learning model to predict whether the input data is authentic (e.g., entered by a legitimate user) or is not authentic (e.g., gibberish input entered by a fraudulent user or a robot). Based on the prediction of the final machine learning model, the disclosed techniques perform one or more actions (e.g., to prevent fraudulent activity, if the account name is not authentic).

Through the analysis of both the input text itself and device signals corresponding the input text (e.g., typing actions), the disclosed techniques may advantageously account for random or unnatural language patterns in input data, such as special characters or unusually spelled words, while still accurately identifying non-authentic (e.g., gibberish) input. The two-part analysis performed in disclosed techniques may advantageously increase the accuracy and robustness of systems analyzing the authenticity of input data. Said another way, integrating device signals into a final prediction for input data rather than exclusively analyzing the input text provides a more accurate prediction of whether input text is authentic than an analysis performed on only the input text. For example, systems executing the disclosed string- and character-level analyses are more likely to accurately identify authentic and not authentic (e.g., gibberish) account names. The accurate analysis provided by the disclosed techniques, in turn, may advantageously assist such systems in blocking suspicious (or even malicious) activity e.g., initiated by new accounts having gibberish account names. The disclosed techniques may also advantageously reduce the loss of end users by reducing the amount and number of times end users are required to undergo time-consuming verification and authentication processes due to erroneous gibberish determinations performed by traditional analysis techniques. In addition, the disclosed techniques ensure data quality within a system receiving user input data.

Example Computer System

FIG. 1 is a block diagram illustrating an example system configured to generate an authentication decision for input data using both string-level and character-level analyses. In the illustrated embodiment, a system 100 includes computing device 120 and computer system 110, which in turn includes string-level model 130, character-level model 140, and machine learning model 160.

Computer system 110, in the illustrated embodiment, receives a set 102 of input data from computing device 120. For example, set 102 of input data includes information that is input by a user, a robot (often referred to as a "bot"), another computer, etc. into computing device 120. In various embodiments, set 102 of input data includes typing data 104 and text data 106. For example, typing data 104 includes various typing characteristics, such as typing speed, typing intervals (as discussed in further detail below with reference to FIG. 2), typing sequences, typed keys on a keyboard or keypad of computing device 120, etc. In some embodiments, typing data 104 includes a typing sequence executed to input text data 106 that includes a series of character typing intervals. For example, a typing sequence includes typing actions (e.g., typed characters) and an amount of time recorded between each typing action (e.g., each key stroke). Typing actions executed at computing device 120 may include typing physical keys on a keyboard of computing device 120 (e.g., a desktop computer or laptop), tapping digital keys on a screen with a finger or stylist, gestures in front of a device screen, etc. In some embodiments, typing characteristics, such as typing speed, may be analyzed according to the type of device utilized to perform various typing actions. For example, a given user typing on a laptop is analyzed differently than the given user typing on their mobile phone. This varying analysis may be accomplished by computer system 110 with different models trained with corresponding data from different types of devices, e.g., a laptop with physical keys or a mobile phone with a touch screen may provide differing data that influences the training of the different models generated by computer system 110.

Text data 106, that is included in set 102 of input data, includes a string of characters or symbols entered into computing device 120. Note that text data 106 may include any of various types of inputs, including: characters, numbers, symbols, etc. As one specific example, text data 106 includes an account name entered by a user into computing device 120 when creating an account with an application or website (e.g., PayPal.com™) executing on computing device 120. In various embodiments, computing device 120 is a desktop computer or a mobile device that receives set 102 of input data from an end user via an application or website. In response to receiving set 102 of input data, computer system 110 executes several models 130, 140, and 160 to generate an authorization decision 112 for computing device based on set 102 of input data.

Computer system 110, in the illustrated embodiment, separates the set 102 of input data into typing data 104 and text data 106 and inputs this data into both string-level model 130 and character-level model 140. In some embodiments, string-level model 130 is a contrastive learning model. In other embodiments, string-level model 130 is another type of machine learning model. In some embodiments, character-level model is a long short-term memory (LSTM) recurrent neural network (RNN) model. In other embodiments, character-level model is another type of neural network model.

String-level model 130 executes to generate a string-level prediction 132 for set 102 of input data based on both the typing data 104 and text data 106. In various embodiments, string-level model 130 is a machine learning model that predicts the authenticity of set 102 of input data based on evaluating an intrinsic relationship between the typing data 104 and the text data 106. For example, computer system 110, or some other system, trains string-level model 130 to identify similarities between text data 106 that is authentic and its corresponding typing data 104. In this way, string-level model 130 is able to identify inauthentic text data 106 based on certain patterns in typing data 104 executed to enter the inauthentic text data 106.

In some embodiments, string-level model 130 is a contrastive learning model that is trained to increase a similarity between embeddings of authentic text data 104 and its corresponding typing data 106. In addition, string-level model 130 is trained to decrease a similarity between embeddings of non-authentic text data 104 and any of various typing data 106 (whether it is the typing data corresponding to the non-authentic text data or typing data corresponding to another set of text data). Still further, string-level model 130 is trained to decrease the similarity between embeddings of authentic text data 104 and non-authentic typing data or typing data corresponding to a different set of text data. Said another way, string-level model 130 outputs similarity scores indicating how likely it is that the text data 106 included in set 102 of input data is authentic and the text data is similar to its corresponding typing data. For example, if text data 106 receives a high similarity score from string level model 130 (indicating that it is similar to its corresponding typing data 106 within the designated embedding space), then it is likely that text data 106 is authentic. In contrast, in this example, if text data 106 is assigned a low similarity score by string-level model 130 (indicating that it is not similar to its corresponding typing data 106 within the designated embedding space), then it is likely that text data 106 is not authentic.

In addition to executing string-level model 130, computer system 110 executes character-level model 140 to generate a character-level prediction 142 for set 102 of input data based on both typing data 104 and text data 106. For example, given a string of characters included in text data 106, character-level model 140 predicts an intended sequence of characters. In this way, model 140 predicts which characters a user meant to input, as opposed to what the user actually input. As one specific example, a final input string included in text data 106 is "abc" and the entered sequence of characters included in text data 106 is the following sequence of keys: "a," "n," "delete," "b," and "c." In this example, for the second and third typing actions, the corresponding typing behaviors result in the typing of character "n" and the deletion of it. Character-level model 140, however, predicts that the user's intention for this behavior was to type "b." Thus, in this example, character-level model 130 predicts an intention character sequence for the set 102 of input data to be: "a," "b," "b," "b," "c." Computer system 110, or another computer system, trains character-level model 140 to distinguish the typing behaviors that correspond to authentic and inauthentic text data 106. This training is accomplished by modeling a typing intention to predict which character was intended to be entered based on a sequence of characters that was actually entered as discussed in further detail below with reference to FIG. 4A.

Machine learning model 160, in the illustrated embodiment, receives string-level prediction 132 and character-level prediction 142, generated by model 130 and model 140, respectively. Machine learning model 160 generates a classification 162 for set 102 of input data based on predictions 132 and 142. For example, machine learning model 160 is a machine learning classifier, such as one or more of the following types of classifier models: a decision tree, a Naïve Bayes model, a neural network, a logistic regression model, etc. In various embodiments, machine learning model 160 classifies set 102 of input data based on two different input predictions 132 and 142.

In various embodiments, classifications (such as classification 162) generated by machine learning model 160 indicate whether set 102 of input data is authentic or not authentic. For example, if set 102 of input data includes an account name that is gibberish (e.g., abljsel), then machine learning model 160 will classify this account name as not authentic (e.g., model 160 outputs a classification score that is close to 1 indicating that this is not an authentic account name). In contrast to this example, if set 102 of input data includes an account name that is not gibberish (e.g., Taylor Smith), then machine learning model 160 will classify this account name as authentic (e.g., model 160 outputs a classification score that is close to 0, indicating that this is an authentic account name). In some situations, a gibberish account name may be entered by a fraudulent or malicious user or by a robot. In the illustrated embodiment, machine learning model 160 automatically classifies set 102 of input data based on both the device data (typing data 104, such as typing patterns used to enter data 102) and the input data (text data 106, such as an account name). In various embodiments, classifications generated by model 160 for set 102 of input data are binary classifications, with values closer to 1 indicating not authentic and values closer to 0 indicating authentic.

In the illustrated embodiment, computer system 110 transmits an authentication decision 112 to computing device 120. In various embodiments, authentication decision 112 indicates the outcome of the multi-model analysis performed by models 130, 140, and 160. In some situations, authentication decision 112 indicates a label of "authentic" for the set 102 of input data determined based on classification 162. In other situations, authentication decision 112 indicates that computing device 120 is authorized to perform an action requested via set 102 of input data e.g., based on classification 162 indicating that the input data is authentic. For example, if set 102 of input data is a request to log into an account, then authentication decision 112 indicates that a user of device 120 is authorized to access their account.

Note that analyzing input data such as account names is one non-limiting example embodiment of the analysis and decisioning that may be performed by computer system 110. In various embodiments, system 110 may perform the disclosed multi-model analysis on various types of input data, including: queries (e.g., the analysis determines whether a query is entered by an authentic user authorized to access data specified in the query), electronic communications (e.g., electronic monetary transactions), graphical data (e.g., a transaction network graph having nodes representing entities and edges representing the electronic communications between the entities), different types of account data (e.g., account data other than account names, such as date of birth, residential address, shipping address, email address, user identifier (ID), etc.), optical character recognition (OCR) data (e.g., data extracted from identification documents of users via OCR extraction methods), names of entities (e.g., names of businesses or legal entities), weather data (e.g., current or future weather patterns for a plurality of locations), etc.

Example Input Data

Figure 2:
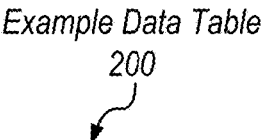
FIG. 2 is a block diagram illustrating an example table of input data and corresponding authentication decisions, according to some embodiments.

FIG. 2 is a diagram illustrating an example table of input data and corresponding authentication decisions. In the illustrated embodiment, example input data table 200 includes the following four columns: text data 206, typing data 204, final prediction 262, and authentication decision 212. In various embodiments, data table 200 is stored in a database implemented by computer system 110 (shown in FIG. 1). Within table 200, four example rows of values for each of these four columns are shown. Note that table 200 may include any of various numbers of rows and is not limited to the four example rows shown in FIG. 2.

In the illustrated embodiment, the first row of table 200 includes an account name under the text data 206 column of Nichole Green. In this example, the disclosed computer system 110 has generated a final prediction the account name "Nichole Green" as an authentic account name (e.g., a final prediction 262 score of 0.1 indicates a classification of 0, which corresponds to an "authentic" label) based on the text of the account name and its corresponding typing data 204. For example, if computer system 110 outputs a final prediction 262 that is a classification score for set 102 of input data that is a value closer to 0, then computer system 110 determines that the set 102 of input data including "Nichole Green" and its corresponding typing data 204 is authentic. Consequently, in this example, computer system 110 has provided an authentication decision 212 of "yes" for this account name based on the final prediction 262 score of 0.1. In various embodiments, a classification score output by computer system 110 may vary for the same user utilizing different types of device or different users utilizing the same device based on the given set of input data for each of these scenarios.

The second row of table 200 includes an account name "Tom Taylor" for the text data 206 column, a typing sequence of one second intervals between each character entered for the typing data 204 column, a final prediction 262 score of 0.3, and an authentication decision 212 of "yes." In contrast, the third row of table 200 includes a text data 206 value of "aaaaabbbb," typing data 204 with a sequence of four seconds, three seconds, and one second between typed characters, a final prediction 262 value of "0.7," and an authentication decision 212 value of "no." Finally, the fourth row of table 200 includes a text data value of "asd eww$," typing data 204 with a sequence of one second, two seconds, three seconds, and one second between the typed characters of value "asd eww$," a final prediction 262 value of "0.95," and an authentication decision 212 value of "no."

Example String-Level Model

Figure 3:
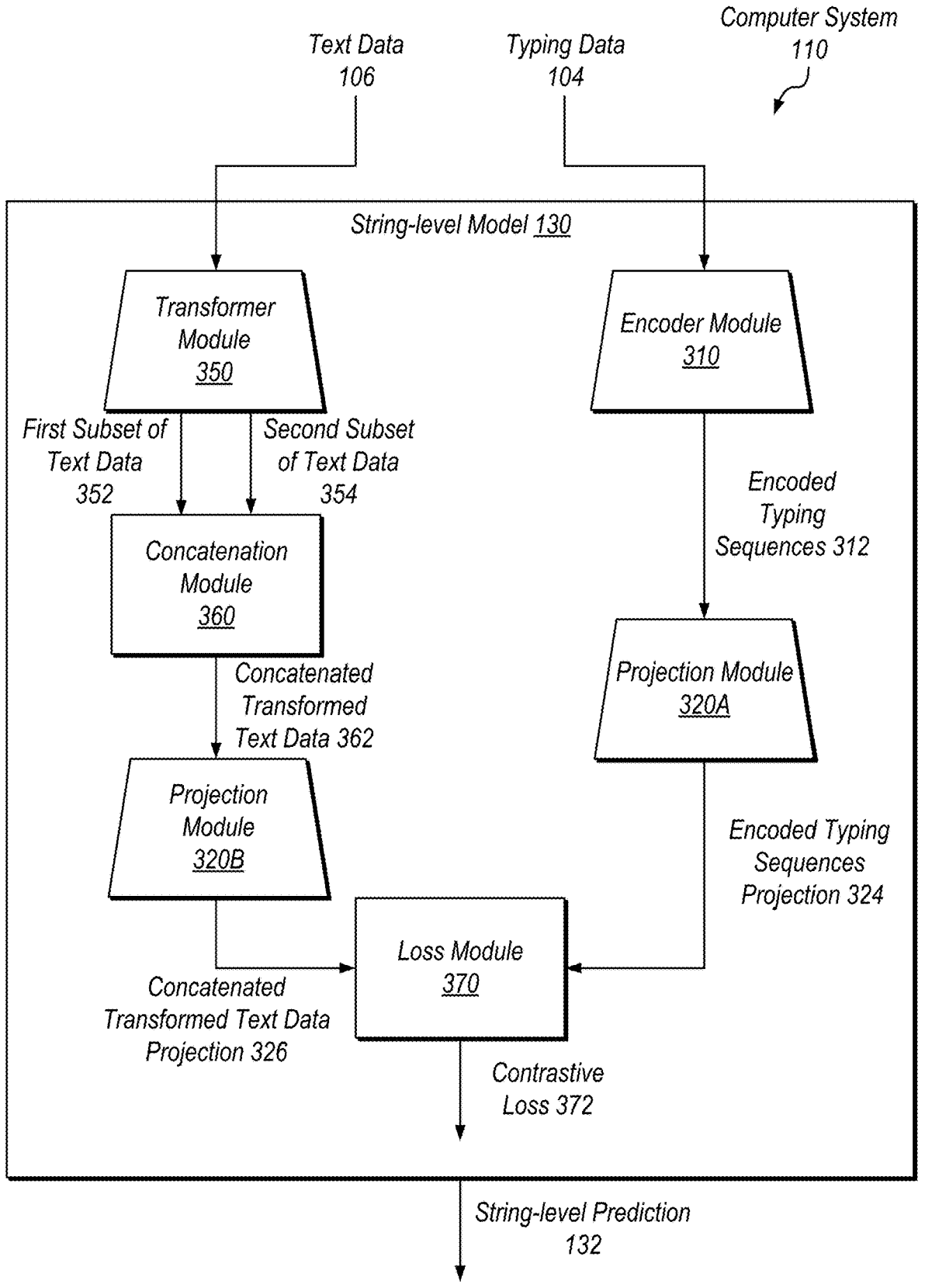
FIG. 3 is a block diagram illustrating example training of a string-level model, according to some embodiments.

FIG. 3 is a block diagram illustrating example training of a string-level model. In the illustrated embodiment, computer system 110 executes string-level model 130 to generate a string-level prediction 132 for set 102 of input data based on text data 106 and typing data 104. In the illustrated embodiment, string-level model 130 inputs text data 106 into transformer module 350 and typing data 104 into encoder module 310.

A first portion of string-level model 130 is shown in the right side of the figure and includes encoder module 310 and projection module 320A. The first portion of string-level model 130 processes typing data 104. Encoder module 310, in the illustrated embodiment, receives typing data 104 as an input and encodes the typing data using one or more encoding methods. For example, encoder module 310 generates encoded typing sequences 312 by converting one or more typing characteristics, such as a typing sequence (e.g., a sequence of pauses between each typed character included in text data 106), into vector form. The encoded typing sequences 312 output by encoder module 310 are a vector representation (i.e., an encoding) of the intervals of time between each typing action included in text data 106. An example typing sequence represented as a list of time intervals such as (1 s, 2 s, 1.5 s, . . . ), is fed into an encoder (e.g., a neural network executed by encoder module 310) to generate a vector representation, such as (0.5, 0.6, . . . ). In this example, the resulting vector is processed by a projection network (e.g., executed by projection module 320A) to produce a projected vector, such as (0.1, 0.5, . . . ).

A second portion of string-level model 130, that includes transformer module 350, processes text data 106. Transformer module 350, in the illustrated embodiment, separates and transforms text data 106 to generate a transformed first subset 352 of text data 106 and a transformed second subset 354 of text data 106. For example, transformer module 350 is an embedding module that transforms a first subset 352 of text data 106 and a second subset 354 of text data 106 into vector form. For example, transformer module 350 may be a word-to-vector embedding module. Concatenation module 360, in the illustrated embodiment, concatenates the first subset 352 and second subset 354 of text data to generate a concatenated, transformed version 362 of the text data. For example, concatenation module 360 combines a vectorized version of a first string and a vectorized version of a second string to generate a vectorized version of a single, combined string. As discussed in further detail below with reference to FIG. 5, text data 106 may be an account name, with the first subset 352 being a first name of the account name and the second subset 354 being a last name of the account name. By separately processing the first and last name of an account name, computer system 110 trains string-level model 130 to understand the relationship between the two names. For example, computer system 110 trains string-level model 130 on representations for the first and last names individually as each of these names may appear independently of one another in different account names received by the string-level model 130 for analysis. Such training may advantageously result in better representations of account names used by computer system 110 to make an authentication decision. In situations in which an account name only includes a first name (or a last name), string-level model 130 includes the first name and a token name such as "unknown" into transformer module 350 in place of the last name.

Projection module 320B, in the illustrated embodiment, provides a linear or non-linear vector projection 326 of the concatenated, transformed text data 362. For example, projection module 320B projects the concatenated transformed text data 362 into the same dimensional space as an encoded typing sequences projection 324 generated by projection module 320A. In this way, string-level model 130 is able to compare and contrast the two projections 326 and 324 (e.g., compare the two pieces of input data 106 and 104).

Loss module 370, in the illustrated embodiment, receives a concatenated, transformed text data projection 326 and an encoded typing sequences projection 324 as input. Loss module 370 generates and outputs contrastive loss 372 for text data and typing data 104 (i.e., for set 102 of input data). In some embodiments, to generate a contrastive loss value for the input data, loss module 370 multiplies the two vectors it receives together. For example, loss module multiplies concatenated, transformed text data projection 326 and encoded typing sequences projection 324. This multiplication results in a contrastive loss value. If the text data vector (projection 326) and the typing data vector (projection 324) are similar, then the contrastive loss 372 value generated by loss module 370 is high (e.g., relative to a similarity threshold controlled by loss module 370). If, however, the two vectors are different, then the contrastive loss 372 value is low (e.g., relative to the similarity threshold). In some embodiments, to generate a contrastive loss 372 value, loss module 370 calculates the cosine similarity between projection 326 and projection 324. The contrastive loss value may also be referred to herein as a "similarity value" which indicates the similarity between the typing data 104 and the text data 106.

While the discussion above with reference to FIG. 3 includes model inference (e.g., execution of a trained string-level model 130), during training of string-level model 130, computer system 110 ensures that model 130 outputs a similarity value that is high for pairs of text data 106 and typing data 104 that correspond to one another and that are used to train model 130. For example, computer system 110 maintains pairs of previously entered text data 106 and corresponding typing data 104 in a database. During training, computer system 110 also inputs pairs of text data 106 and typing data 104 that do not correspond to one another into model 130 (i.e., this typing sequence was not used to input this text data). If model 130 outputs low similarity values (i.e., indicating that the pairs are not similar), then computer system 110 concludes training of the model. If, however, the similarity values output by model 130 for mismatched pairs are high, then computer system 110 ensures, via adjusting one or more weights of the model during training, that model 130 outputs a low value for these mismatched training samples for future rounds of training. In this way, computer system 110 adjusts string-level model 130 during training such that string-level model accurately classifies sets of input data (that include both text and typing data) in terms of the similarity between the embeddings of the text and typing data included in the sets of input data.

In this disclosure, various "modules" operable to perform designated functions are shown in the figures and described in detail (e.g., transformer module 350, encoder module 310, concatenation module 360, projection module 320A, projection module 320B, loss module 370, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. The term "engine" may also be used interchangeably with the term "module" herein. For example, as used herein, the term "query engine" refers to a set of software instructions that are executable by one or more server instances. A single query engine may be run on a given server instance or multiple query engines may be run by a given server instance.

Example Character-Level Model

Figure 4A:
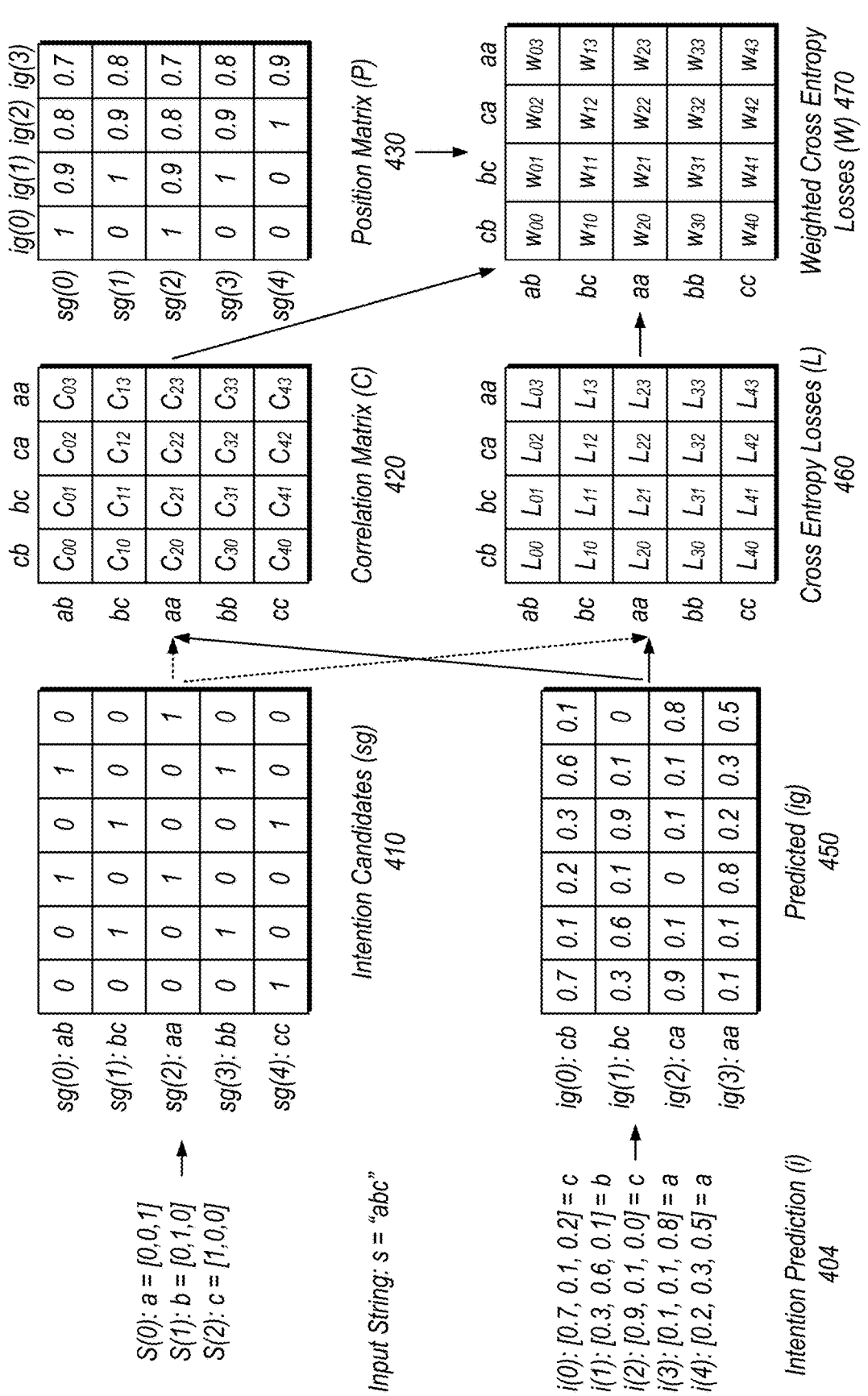
FIG. 4A is a diagram illustrating example training of a character-level model using a plurality of matrices, according to some embodiments.

FIG. 4A is a diagram illustrating example training of a character-level model using a plurality of matrices. In the illustrated embodiment, a plurality of matrices 410, 420, 430, 450, 460, and 470 are shown that are generated based on an input string, s, which has the value "abc." In various embodiments, computer system 110 generates a plurality of matrices while training character-level model 140 to predict an intended typing sequence for various sets 102 of input data based on a string of characters included in the set 102 of input data. Instead of training character-level model 140 to predict an input string itself, the disclosed techniques train model 140 to predict the intended input sequence. Such techniques may advantageously account for input strings that are unusual (e.g., include accent characters, unusual numbers, unusual characters such as Chinese Pinyin characters, combinations of unusual characters, etc.), which are likely to cause traditional prediction techniques to classify the input string as gibberish. In this way, the disclosed techniques may classify an input string as authentic even if it includes unusual characters or character combinations.

During training and as discussed in further detail below, computer system 110 generates intention 2-gram candidates matrix 410 based on the input string, s as shown in FIG. 4A. Further during training, character-level model 140 predicts the sequence of the intended characters (intention prediction (i) 404 shown in FIG. 4A) (which is an intermediate output and not the final output of the character-level analysis). Still further during training, computer system 110 generates the predicted 2-grams (ig) 450 shown in FIG. 4 based on the sequence of intended characters 404 output by character-level model 140. The predicted 2-grams (ig) 450 are then used to adjust the training of character-level model 140 (via the use of matrices 430, 460, 470 and at times matrix 420).

In various embodiments, computer system 110 trains character-level model 140 to predict, given a portion of an input string and a given time interval for the portion of the string that was typed in the given time interval, which character was intended to be input for the given time interval. As one specific example, if a user types "a," then character-level model 140 predicts that the user is likely to type "b" next. In this example, however, the user accidently enters "c" after entering "a," and then goes back and deletes the "c" and enters "b" instead. In this example, computer system 110 trains character-level model 140 to predict that the intention of the user is to type "b" after typing "a" even though they mistakenly typed "C" An example inference performed by a trained character-level model 140 is discussed in further detail below with reference to FIG. 4B.

In various embodiments, a notable difference between abnormal typing behavior and authentic or "normal" typing behavior is that the abnormal typing is usually done inattentively and randomly (e.g., rapid keystrokes on neighboring or repeating keys in an alternating way). In contrast, normal typing behavior often follows one or more patterns that adhere to the principles in ergonomics, neuroscience, and other relevant fields. As such, computer system 110 trains character-level model 140 to model normal typing behavior by using an intention prediction model from the character-level perspective. Such techniques enable the trained model 140 to generate a set of features that is discriminative for differentiating between normal and abnormal typing behaviors.

In disclosed techniques, given the input string, s, (which may be an input first name and last name of an account name) and the typing speed data $t=\{tn\}$, $n \in [0, N-1]$, character-level model 140 is trained to predict what an end user intends to type for each typing action. The typing speed data consists of the time intervals between each of two consecutive typing actions, where N is the number of typing intervals. Because an input string, s, is the final version of the user input (i.e., the input string after the typing actions have been completed, including deletions), multiple typing actions may correspond to one final submitted character. For example, when the input string is "abc" and the input procedure consists of five typing actions, the typing sequence of the keys may be: "a," "n," "delete," "b," and "c." Although the typing behaviors corresponding to the second and third typing actions result in the character "n" being input and then being deleted, the user's actual intention in this situation was to enter "b" and, therefore the sequence of the intentions for this input behavior is ["a," "b," "b," "b," "c" ]. In some embodiments, character-level model 140 is a recurrent neural network (RNN) model, such as a long short-term memory (LSTM) model, trained to predict an intended typing sequence of various sets of input data based on an input string and a corresponding typing speed.

In the illustrated embodiment, an intention candidates matrix 410, sg, is shown. Computer system 110 generates intention candidates matrix 410 based on input string using a 2-gram method. The disclosed 2-gram prediction method includes generating predictions of the sequences of two characters. For example, the 2-gram prediction method generates a prediction of the sequence of intended characters and then computer system 110 forms 2-grams from this predicted sequence. A 2-gram is a prediction of a next sequence of 2 characters that a user will enter, such as the two character sequence "ab." In various embodiments, character-level model 140 generates predictions based on 2-grams in order to preserve sequential information of two consecutive typing actions.

Computer system 110 calculates the 2-gram intention candidates included in matrix 410, sg={smg}, m∈[0, M−1] (e.g., sg(0), sg(1), etc. as shown in FIG. 4A, from the input string s, where M is the number of candidates. For example, the 2-gram candidates of "abc" are ["ab", "bc", "aa", "bb", "cc" ]. In this example, the 2-grams formed by two repeating characters simulates scenarios in which multiple typing actions may correspond to the intention of one character. As shown in FIG. 4A, which illustrates training of character-level model 140, input characters included in the input string s are encoded to one-hot vectors. For example, the character "a"→[0, 0, 1], and the resulted 2-gram "ab" is represented by sg(0)=[0, 0, 1, 0, 1, 0] as shown in the top row of intention candidate matrix 410. In the illustrated embodiment, model 140 generates an intention prediction 404, i, for input string s (i.e., 'abc'), which is in the form of a sequence of vectors. For example, the vector i(0)=[0.7, 0.1, 0.2]can be interpreted as character "c," and the predicted intention sequence is ["c", "b", "c", "a", "a" ] for the sequence of vectors included in the prediction 404 output by model 140. In this example, the predicted 2-gram included in matrix 450, labeled ig in FIG. 4A, are ["cb," "bc," "ca," "aa" ].

Computer system 110 adopts a cross entropy loss function for generating pair-wise measurements indicating differences between predicted 2-grams 450 generated by model 140 and intention 2-gram candidates 410 generated by computer system 110 from the input string s. In the illustrated embodiment, computer system 110 applies a cross entropy loss on each of the individual characters. For example, computer system 110 calculates the cross entropy loss by:

$$L_0=L(\text{``}cb,\text{''}\text{ ``}ab\text{''})=CE(i_0,s_0)+CE(i_1,s_1)$$

in which CE denotes the cross entropy loss function, where the first item is the predicted intention vector, and the second item is the target vector. In this example, as the input string is "abc," the first intention prediction must be "a" and the following intention could be "a" or "b." Subsequently, the first predicted 2-gram is "ab" or "aa." In addition, computer system 110 defines a position matrix 430, P, to inject the prior knowledge of input strings. As shown in FIG. 4A, an example position matrix 430, P, is shown. For the first 2-gram ig(0), the weights for sg(0): "ab" and sg(2): "aa" are both 1's, and for other 2-gram candidates, the weights are 0's. For the second 2-gram ig(1), the weight for sg(1) (which is "bc") and sg(3) (which is "bb") is 1, and the weight for sg(0) (which is "ab") and sg(2) (which is "aa") is 0.9.

In various embodiments, computer system 110 decreases weights for a given 2-gram candidate in order to provide prior knowledge about a user's intended behavior. For example, lower weights train model 140 that the probability that a user's intention of typing the earlier characters in the string at a later time should be lower. In this way, the position matrix 430, P, narrows down the searching space for each predicted 2-gram. In various embodiments, computer system 110 trains character-level model 140 to minimize the pair-wise difference between the loss functions (the cross-entropy loss L) calculated for the intention 2-gram candidates in matrix 410 and the predicted 2-grams in matrix 450.

As the training of model 140 progresses (e.g., additional rounds of strings are input and cross entropy losses are calculated), model 140 may produce more certain predictions. There may, however, exist some conflicting loss items during training of model 140. For example, in L00 and L20, there are CE(i1, s1) and CE(i1, s0), i.e., there are two targets for i1 (the second intention prediction) which are "b" and "a." In order to reduce conflicts during training of model 140 and further narrow the searching space for each predicted 2-gram, computer system 110 introduces a correlation matrix 420 "C." This matrix is calculated based on the similarity scores between the predicted 2-grams 450 and the 2-gram intention candidates 410 generated for the input string s. In some embodiments, correlation matrix 420 is only applied after a warming up period in the training process. For example, correlation matrix 420 is introduced later in training in order to introduce more randomness or possibilities during an initial stage of training character-level model 140.

By learning and encoding typing behavior patterns from previous input data (that is authentic), character-level model 140 is able to capture authentic typing patterns and generate features that are indicative of these authentic typing patterns. This, in turn, helps character-level model 140 in distinguishing between authentic and non-authentic typing behavior during inference. For example, as discussed in further detail below with reference to FIG. 4B, when trained character-level model 140 is executed during model inference, a feature vector generated by the model is composed of the average loss items for each intention 2-gram candidates, i.e., feature vector $f_{character}=[v_n]$, where n∈[0, ..., N−1] and $v_n$ is calculated by:

$$v_n = \frac{1}{M}\sum_{m\in|0,M-1|} P_{mn}*C_{mn}*L_{mn}$$

In various embodiments, the greater the weighted cross entropy loss values, W (values included in matrix 470), calculated by computer system 110 for predictions generated by character-level model 140, the higher the likelihood that an input string, s, is not authentic. For example, a weighted cross entropy loss value closer to 1 indicates that an input string is not authentic, while a weighted cross entropy loss value closer to 0 indicates that an input string is authentic.

Figure 4B:
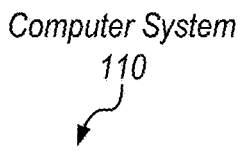
FIG. 4B is a block diagram illustrating example execution of a trained character-level model, according to some embodiments.
Figure 4B:
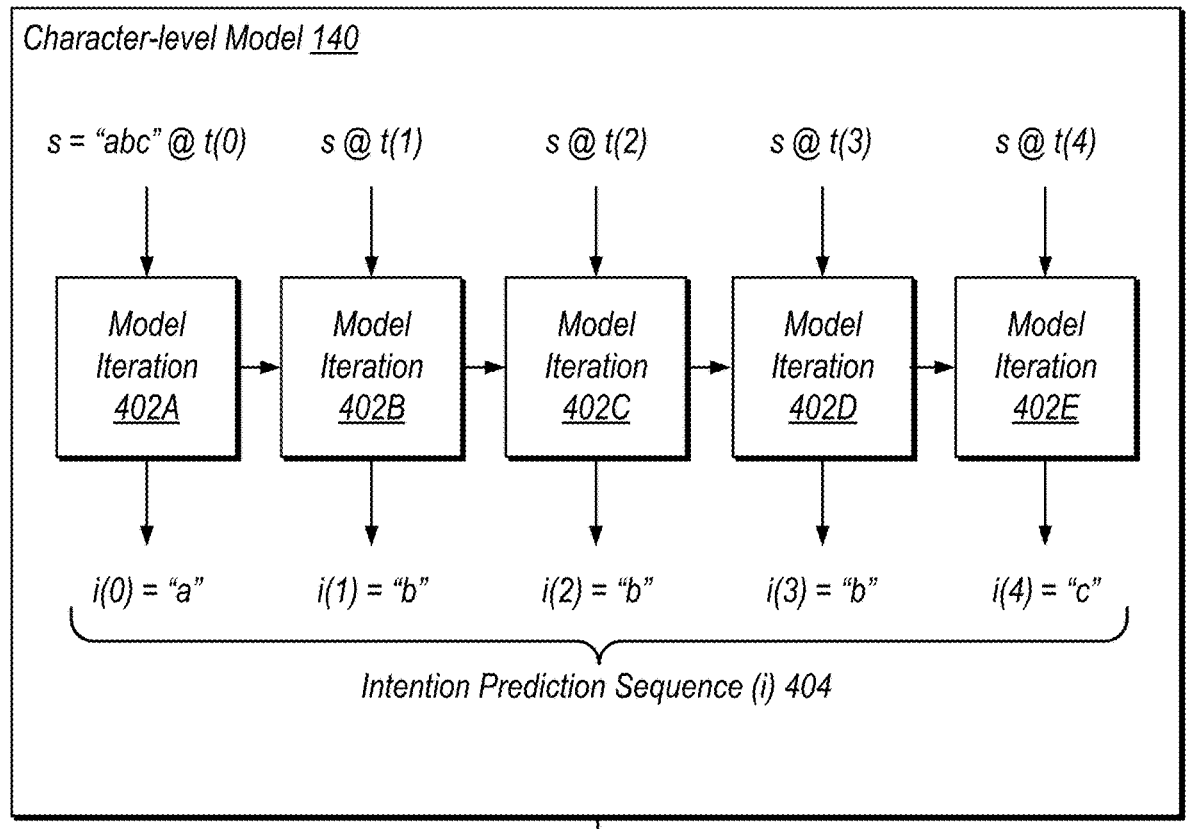

FIG. 4B is a block diagram illustrating example execution of a trained character-level model. In the illustrated embodiment, computer system 110 executes character-level model 140 to generate a character-level prediction. Key 400, in the illustrated embodiment, includes an input string "s," an intention prediction sequence "i(n)," and a time interval "t(n)." As depicted in FIG. 4B, the input feature vector of model 140 is formed by concatenating the feature embedding of the input string, s, and each time interval t(n). The feature embedding of the input string is calculated by concatenating the vectors of the characters inside the input string. As discussed above with reference to FIG. 4A, computer system 110 trains model 140 to predict the intention prediction sequence 404 i(n)={in}, n∈[0, N−1] for a given input typing behavior (i.e., an input string and its corresponding typing speed sequence). In some embodiments, computer system 110 trains character-level model 140 in an unsupervised manner. In other embodiments, computer system 110 trains character-level model 140 in a supervised manner.

In the illustrated embodiment, computer system 110 executes a trained character-level model 140 during an inference process to generate a character-level prediction feature vector 442 (i.e., feature vector $f_{character}=[v_n]$). Model 140 first generates an intended prediction sequence (i) 404 (discussed in detail above with reference to FIG. 4A) of "abbbc," which corresponds to the sequence that the user intended to enter. This intended sequence is an intermediate output of model 140, which model 140 uses to calculate the feature vector 442, $f_{character}=[v_n]$. Character-level model 140 calculates the feature vector 442 based on the predicted intention sequence and the input string, s. For example, the intention 2-gram candidates in shown in matrix 410 of FIG. 4A are generated based on the input string, s, and the predicted 2-grams shown in matrix 450 of FIG. 4A are created based on the predicted intention sequence "i" 404. Model 140 executes in multiple iterations 402A-402E depending on the length of the input sequence, s, and the typing actions taken by the user. In this example, the typing actions taken by the user are "a," "n," "delete," b," and "c." Thus, in this example, character-level model 140 executes five model iterations 402A-402E.

In various embodiments, during inference, character-level model 140 executes to generate an intended 2-gram candidates matrix (sg) 410 based on an input string, s. Further during inference, character-level model 140 predicts a sequence of intended characters (i) 404 and generates predicted 2-grams (ig) 450 from the sequence 404. Based on the intention 2-gram candidates 410- and the predicted 20 grams 450, character-level model 140 generates and outputs a feature vector, $f_{character}=[v_n]$), using the equation discussed above with reference to FIG. 4A.

In various embodiments, the character-level analysis performed by model 140 is a deep-learning intention prediction method that involves analyzing each typing action in a set of input text in order to predict an intention behind this typing action. This intention prediction is then utilized to identify whether the actual input string and the corresponding typing data follow a "normal" expected typing pattern (or whether it is likely gibberish) based on the calculation of the feature vector, $f_{character}=[v_n]$, using intention 2-gram candidates and predicted 2-grams. As discussed above with reference to FIG. 1, the character-level prediction feature vector 442 (one example of character-level prediction 142) output by character-level model 140 is input to machine learning model 160, along with the string-level prediction 132 generated by string-level model 130 for classification of a corresponding set 102 of input data.

Example Classification System

Figure 5:
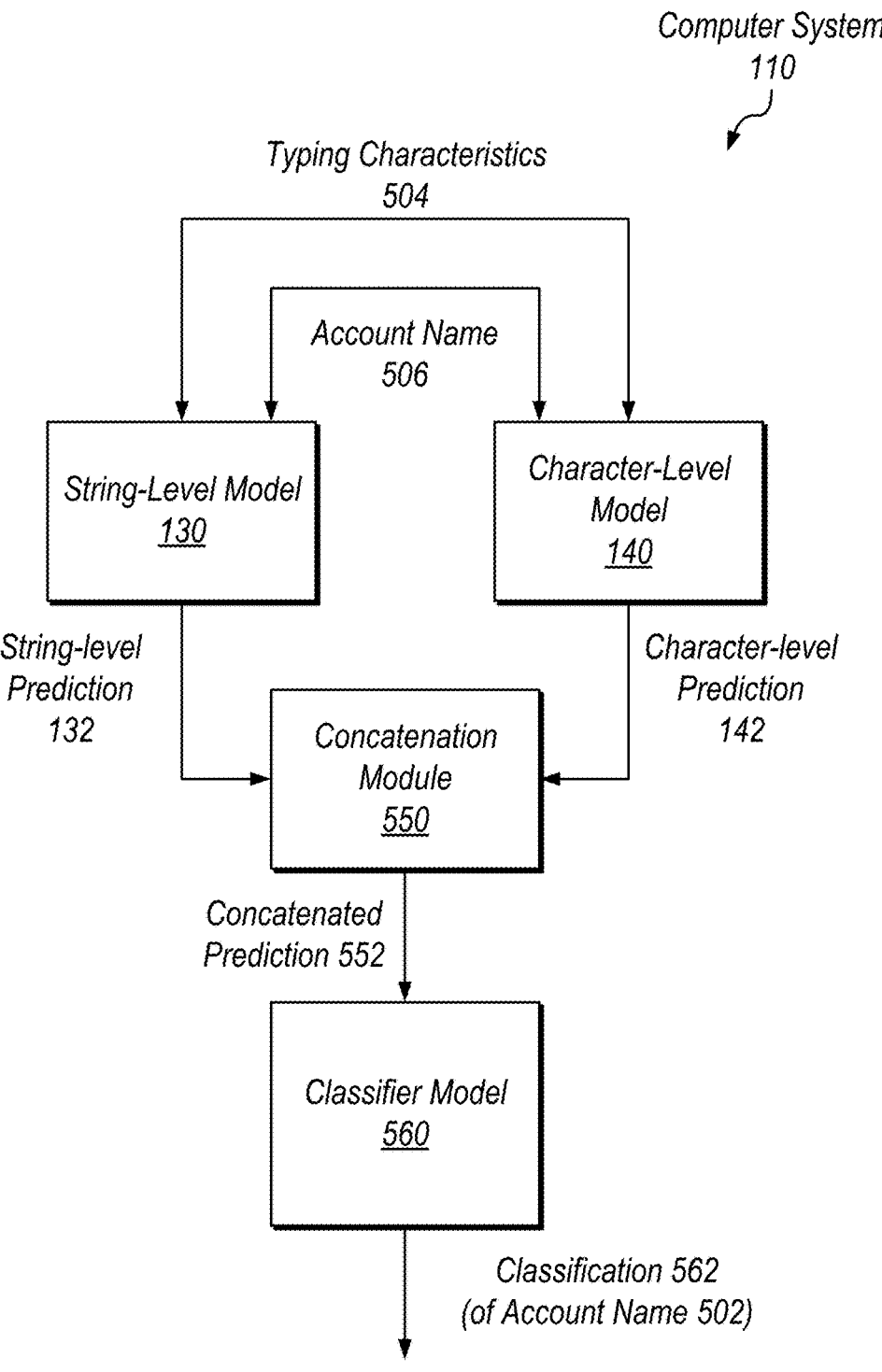
FIG. 5 is a diagram illustrating an example system configured to classify an account name, according to some embodiments.

FIG. 5 is a diagram illustrating an example system configured to classify an account name. In the illustrated embodiment, computer system includes string-level model 130, character-level model 140, concatenation module 550, and classifier model 560. Computer system 110, in the illustrated embodiment, generates a classification 562 for an account name 506 entered at a computing device (e.g., computing device 110) based on the account name itself and typing characteristics 504 corresponding to the input account name 506.

String-level model 130, in the illustrated embodiment, receives typing characteristics 504 and account name 506 as input and outputs a string-level prediction 132. Similarly, character-level model 140 receives the same inputs as model 130 and outputs a character-level prediction 142. Concatenation module 550, in the illustrated embodiment, concatenates string-level prediction 132 and character-level prediction 142 to generate concatenated prediction 552.

Classifier model 560, in the illustrated embodiment, receives concatenated prediction 552 as input and generates a classification 562 for account name 502. For example, computer system 110 adopts a machine learning classifier model 560, such as a multi-layer perceptron, a convolutional neural network (CNN), a transformer-based classifier, an XGBoost classifier, etc., as a final gibberish detection model. For example, classifier model 560 classifies account name 506 as either authentic or as a gibberish account name (that may have been entered by a malicious user). Classifier model 560, as shown in FIG. 5, receives a final feature vector (concatenated prediction 552). Classifier model 560 forms the final feature vector, concatenated prediction 552, by concatenating the individual feature vectors generated by string-level contrastive learning model 130 and character-level model 140. In the illustrated embodiment, classifier model 560 provides a prediction (i.e., classification 562) indicating whether an account name is gibberish or genuine, based on the typing behavior included in the input data and the input data itself.

In various embodiments, computer system 110 integrates device signals (e.g., typing actions) into analysis performed on data input via the device. In this way, computer system 110 is not only focused on the analysis of the input data itself, but also corresponding device signals. In disclosed techniques, device signal behavior is modeled from two points of view: a string macro view (e.g., evaluating an entire input string) and a character micro level (e.g., intricately model an entity's intention during typing at a smaller level than the string-level analysis).

Example Method

FIG. 6 is a flow diagram illustrating an example method for providing an authorization decision for input data based on both string-level and character-level analyses of the input data, according to some embodiments. The method 600 shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, computer system 110 performs the elements of method 600.

At 610, in the illustrated embodiment, a computer system detects a set of input data at a computing device, where the set of input data includes text data and typing data. In some embodiments, the text data included in the set of input data is an account name. In some embodiments, the typing data is a sequence of typing actions (including intervals of time between each typing action) taken to enter the text data.

At 620, the computer system generates, using a string-level model, a string-level prediction for the set of input data, where the string-level model is trained to increase a similarity between embeddings of authentic text data and corresponding sequences of typing data included in the set of input data. In some embodiments, the string level model is further trained to decrease the similarity between non-authentic text data and corresponding non-authentic sequences of typing data based on negative training samples. In some embodiments, the negative training samples are generated by pairing a first set of previously entered text data with a plurality of typing sequences corresponding to a second, different set of previously entered text data, wherein text data in the first set includes authentic and non-authentic text data.

In some embodiments, the sequence of typing actions includes typed characters and deleted characters. In some embodiments, the intended sequence of characters includes less characters than a number of characters typed during the sequence of typing actions. In some embodiments, the string-level model is a contrastive learning model. In some embodiments, the character-level model is a long short-term memory (LSTM) recurrent neural network (RNN) model. In some embodiments, the machine learning model is a machine learning classifier.

In some embodiments, generating the string-level prediction for the set of input data includes generating a contrastive loss value for the set of input data. In some embodiments, generating the contrastive loss value for the set of input data includes inputting the typing data included in the set of input data into a typing encoder and generating a first projection of a typing vector that is output by the typing encoder. In some embodiments, generating the contrastive loss value for the set of input data includes inputting the text data included in the set of input data into a text transformer and generating a second projection of a text vector that is output by the text transformer. In some embodiments, generating the contrastive loss value for the set of input data includes multiplying the first projection of the typing vector and the second projection of the text vector, where the contrastive loss value generated by the multiplying indicates a similarity between the typing data and the text data.

At 630, the computer system generates, using a character-level model, a character-level prediction for the set of input data, where the character-level model predicts an intended sequence of characters based on the text data and a sequence of typing actions included in the set of input data. In some embodiments, the character-level prediction is a feature vector calculated based on a user's predicted intended sequence of characters for respective typing actions included in the set of input data. In some embodiments, the character-level prediction is generated based on a string of characters included in the set of input data and one or more typing characteristics corresponding to the string of characters. In some embodiments, the character-level model predicts, for respective characters of text data included in the set of input data and based on its corresponding time interval, which character is intended to be entered for a next time interval. In some embodiments, the character-level model is trained by generating an intention candidate matrix from a text string included in the text data of the set of input data and generating a predicted matrix from the text string using the character-level model.

In some embodiments, the character-level model is trained by generating a cross-entropy loss matrix from the intention candidate matrix and the predicted matrix. In some embodiments, the character-level model is adjusted based on the cross-entropy loss matrix. For example, one or more weights of the character-level model are altered based on values included in the cross-entropy loss matrix.

In some embodiments, generating the character-level prediction for the set of input data using the character-level model is performed by iteratively generating, based on a text string and typing intervals included in the set of input data, a predicted next character intended to be entered by an entity that input the set of input data at the computing device, where the character-level prediction is a feature vector calculated based on predicting an intended sequence of characters for the text string and typing data included in the set of input data. The iterative generation performed by the character-level model is discussed in detail above with reference to FIG. 4B.

At 640, the computer system determines, using a machine learning model, whether the set of input data detected at the computing device is authentic input, where the determining is performed based on the string-level prediction and the character-level prediction. In some embodiments, determining whether the set of input data is authentic includes determining whether an account name included in the set of input data is an authentic account name.

In some embodiments, determining whether the set of input data is authentic includes determining whether text data included in the set of input data is entered randomly or inattentively. For example, a user might enter their account name using rapid keystrokes on neighboring or repeating keys in an alternating or inattentive manner. In some embodiments, the character-level model predicts, for respective characters of the text data and based on its corresponding time interval, which character is intended to be entered for a next time interval.

At 650, the computer system transmits, to the computing device, an authentication decision, where the authentication decision is generated based on determining whether the set of input data is authentic. In some embodiments, the authentication decision indicates whether the set of input data is authentic. In some embodiments, the authentication decision includes an authorization decision indicating whether a user action requested via the set of input data is authorized. For example, if set of input data includes an account name (e.g., a username) and a password, the authentication decision may include an authorization decision for the request to log in to an application executing on computing device 120.

In addition to method 600 and its variants, non-transitory, computer-readable media storing program instructions executable to implement such methods are also contemplated, along with systems configured to implement these methods.

The various techniques described herein may be performed by one or more computer programs. The term "program" is to be construed broadly to cover a sequence of instructions in a programming language that a computing device can execute. Computer system 110, shown in FIG. 1., may also be referred to herein as a "computer system" and is one example of the computing device that may execute various sequences of instructions that make up a program. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system, such as computer system 110. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system such as computer system 110) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

The present disclosure refers to various software operations that are performed in the context of one or more computer systems. String-level model 130 or character-level model 140 can each execute on respective computer systems, for example. Similarly, machine learning model 160 can be implemented on a computer system associated with a database storing previous input data, training features, previously trained models, etc. Each of these components, then, is implemented on physical structure (i.e., on computer hardware).

In general, any of the services or functionalities of a software development environment described in this disclosure can be performed by a host computing device, which is any computer system, such as computer system 110, that is capable of connecting to a computer network. A given host computing device can be configured according to any known configuration of computer hardware. A typical hardware configuration includes a processor subsystem, memory, and one or more I/O devices coupled via an interconnect. For example, computer system 110 receives batch queries from one or more client computing devices via an interconnect corresponding to an I/O device of computer system 110 and stores data in a memory, such as a database utilized managed by computer system to store data, e.g., in table, such as data table 200, as shown in FIG. 2. A given host computing device may also be implemented as two or more computer systems operating together.

The processor subsystem of the host computing device may include one or more processors or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable to store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity]configured to [perform one or more tasks]-is used herein to refer to structure (i.e., something physical). More specifically, this formulation is used to indicate that this structure is arranged to perform the one or more tasks during operation. A structure can be said to be "configured to"

perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(*f*) during prosecution of a United States patent application based on this disclosure, it will recite claim elements using the "means for" [performing a function]construct.

What is claimed is:

1. A method, comprising:

detecting, by a computer system, a set of input data at a computing device, wherein the set of input data includes text data and typing data;

generating, by the computer system using a string-level model, a string-level prediction for the set of input data, wherein the string-level model is trained to increase a similarity between embeddings of authentic text data and corresponding sequences of typing data included in the set of input data;

generating, by the computer system using a character-level model, a character-level prediction for the set of input data, wherein the character-level model predicts an intended sequence of characters based on the text data and a sequence of typing actions included in the set of input data;

determining, by the computer system using a machine learning model, whether the set of input data detected at the computing device is authentic input, wherein the determining is performed based on the string-level prediction and the character-level prediction; and transmitting, by the computer system to the computing device, an authentication decision, wherein the authentication decision is generated based on determining whether the set of input data is authentic.

2. The method of claim 1, wherein the character-level prediction is a feature vector calculated based on a user's predicted intended sequence of characters for respective typing actions included in the set of input data, and wherein the character-level prediction is generated based on a string of characters included in the set of input data and one or more typing characteristics corresponding to the string of characters.

3. The method of claim 1, wherein the string-level model is further trained to decrease the similarity between non-authentic text data and corresponding non-authentic sequences of typing data based on negative training samples generated by:

pairing a first set of previously entered text data with a plurality of typing sequences corresponding to a second, different set of previously entered text data, wherein text data in the first set includes authentic and non-authentic text data.

4. The method of claim 1, wherein determining whether the set of input data is authentic includes determining whether an account name included in the set of input data is an authentic account name.

5. The method of claim 1, wherein the sequence of typing actions includes typed characters and deleted characters, and wherein the intended sequence of characters includes less characters than a number of characters typed during the sequence of typing actions.

6. The method of claim 1, wherein the character-level model predicts, for respective characters of text data included in the set of input data and based on its corresponding time interval, which character is intended to be entered for a next time interval.

7. The method of claim 1, wherein generating the string-level prediction for the set of input data includes generating a contrastive loss value for the set of input data by:

inputting the typing data included in the set of input data into a typing encoder;

generating a first projection of a typing vector that is output by the typing encoder;

inputting the text data included in the set of input data into a text transformer;

generating a second projection of a text vector that is output by the text transformer; and multiplying the first projection of the typing vector and the second projection of the text vector, wherein the contrastive loss value generated by the multiplying indicates a similarity between the typing data and the text data.

8. The method of claim 1, wherein generating the character-level prediction for the set of input data using the character-level model is performed by:

iteratively generating, based on a text string and typing intervals included in the set of input data, a predicted next character intended to be entered by an entity that input the set of input data at the computing device, wherein the character-level prediction is a feature vector calculated based on predicting an intended sequence of characters for the text string and typing data included in the set of input data.

9. The method of claim 1, wherein the string-level model is a contrastive learning model, wherein the character-level model is a long short-term memory (LSTM) recurrent neural network (RNN) model, and wherein the machine learning model is a machine learning classifier.

10. A non-transitory computer-readable medium having program instructions stored therein that are executable by a computer system to perform operations comprising:

detecting a set of input data at a computing device, wherein the set of input data includes text data and typing data;

generating, using a first machine learning (ML) model, a first prediction for the set of input data, wherein the first ML model is trained to increase a similarity between embeddings of authentic text data and corresponding sequences of typing data included in the set of input data;

generating, using a second, different ML model, a second prediction for the set of input data, wherein the second prediction is a feature vector output by the second ML model based on predicting an intended sequence of text based on the text data and a sequence of typing actions included in the set of input data;

determining, using a classifier model, whether the set of input data detected at the computing device is authentic input, wherein the determining is performed based on the first prediction and the second prediction; and transmitting, to the computing device, an authentication decision, wherein the authentication decision is generated based on determining whether the set of input data is authentic.

11. The non-transitory computer-readable medium of claim 10, wherein the second prediction is a character-level prediction that is a feature vector calculated based on a user's predicted intended sequence of characters for respective typing actions included in the set of input data, and wherein the character-level prediction is generated based on a string of characters included in the set of input data and one or more typing characteristics corresponding to the string of characters.

12. The non-transitory computer-readable medium of claim 10, wherein the first ML model is a string-level model that is further trained based on negative training samples generated by:

pairing a first set of previously entered text data with a plurality of typing sequences corresponding to a second, different set of previously entered text data, wherein text data in the first set includes authentic and non-authentic text data.

13. The non-transitory computer-readable medium of claim 10, wherein the sequence of typing actions includes characters that are typed and then deleted, and wherein the intended sequence of characters includes less characters than a number of characters typed during the sequence of typing actions.

14. The non-transitory computer-readable medium of claim 10, wherein generating the first prediction for the set of input data includes generating a contrastive loss value for the set of input data by:

inputting a first subset of the set of input data into an encoder;

generating a first projection of a first vector that is output by the encoder;

inputting a second subset of the set of input data into a transformer;

generating a second projection of a second vector that is output by the transformer; and multiplying the first projection of the first vector and the second projection of the second vector, wherein the contrastive loss value generated by the multiplying indicates a similarity between the first subset of input data and the second subset of input data.

15. The non-transitory computer-readable medium of claim 10, wherein the second ML model is a character-level model that is trained by:

generating an intention candidate matrix from a text string included in the text data of the set of input data;

generating a predicted matrix from the text string using the character-level model;

generating a cross-entropy loss matrix from the intention candidate matrix and the predicted matrix; and adjusting the character-level model based on the cross-entropy loss matrix.

16. A system comprising:

a processor; and a non-transitory computer-readable medium having stored thereon instructions that are executable by the processor to cause the system to perform operations comprising:

detecting a set of input data at a computing device, wherein the set of input data includes text data and typing data;

generating, using a string-level model, a string-level prediction for the set of input data, wherein the string-level model is trained to increase a similarity between embeddings of authentic text data and corresponding sequences of typing data included in the set of input data;

generating, using a character-level model, a character-level prediction for the set of input data, wherein the character-level model predicts an intended sequence of characters based on the text data and a sequence of typing actions included in the set of input data;

determining, using a machine learning model, whether the set of input data detected at the computing device is authentic input, wherein the determining is performed based on the string-level prediction and the character-level prediction; and transmitting, to the computing device, an authentication decision, wherein the authentication decision is generated based on determining whether the set of input data is authentic.

17. The system of claim 16, wherein the character-level prediction is a feature vector that is calculated based on a user's predicted intended sequence of characters for respective typing actions included in the set of input data, and wherein the character-level prediction is generated based on a string of characters included in the set of input data and one or more typing characteristics corresponding to the string of characters.

18. The system of claim 16, wherein the string-level model is further trained by:

generating negative training samples by pairing a first set of previously entered text data with a plurality of typing sequences corresponding to a second, different set of previously entered text data, wherein text data in the first set includes authentic and non-authentic text data.

19. The system of claim 16, wherein determining whether the set of input data is authentic includes determining whether text data included in the set of input data is entered randomly, and wherein the character-level model predicts, for respective characters of the text data and based on its corresponding time interval, which character is intended to be entered for a next time interval.

20. The system of claim 16, wherein generating the string-level prediction for the set of input data includes generating a contrastive loss value for the set of input data by:

inputting the typing data included in the set of input data into a typing encoder;

generating a first projection of a typing vector that is output by the typing encoder;

inputting an account name included in the text data into a text transformer;

concatenating a first name vector and a last name vector that are output by the text transformer;

generating a second projection of a concatenated account name vector that is output by the text transformer; and determining a cosine similarity between the first projection of the typing vector and the second projection of the concatenated account name vector, wherein a cosine similarity value generated by the determining indicates a similarity between the typing data and the account name.

* * * * *